UNITED STATES PATENT OFFICE.

MORITZ von ROHR, OF JENA, GERMANY, ASSIGNOR TO THE FIRM OF CARL ZEISS, OF JENA, GERMANY.

TORIC SPECTACLE-GLASS.

989,645.  Specification of Letters Patent.  Patented Apr. 18, 1911.

Application filed August 25, 1910. Serial No. 578,863.

*To all whom it may concern:*

Be it known that I, MORITZ VON ROHR, a citizen of the German Empire, residing at Carl-Zeiss strasse, Jena, in the Grand Duchy of Saxe-Weimar, Germany, have invented a new and useful Toric Spectacle-Glass, of which the following is a specification.

The invention relates to spectacle glasses, which are intended to compensate the astigmatic defect of an eye by means of similar but opposite astigmatism, namely to toric glasses, both sphero-toric and bitoric. In the sphero-toric glasses the center of the spherical surface lies in the equatorial plane of the toric surface. The axis of the glass lies in this equatorial plane, contains the above mentioned center and intersects the axis of the toric surface. With the bi-toric glasses two cases are to be distinguished. The axes of the two toric surfaces can lie parallel to each other. But they can also cross one another at right angles. In the case of the parallel axes the equatorial plane is common to both surfaces and the axis of the glass lies in this plane and intersects the axes of both surfaces. In the case of the axes which cross one another at right angles, the two equatorial planes are perpendicular to each other. Their line of intersection is the axis of the glass. All toric glasses belong to the bi-symmetrical ones, *i. e.* to those with two planes of symmetry, which intersect at right angles in the axis of the glass. With the sphero-toric glasses and the bi-toric ones with parallel axes, the one plane of symmetry is formed by the equatorial plane of the toric surface or surfaces respectively, the other by that meridional plane of the toric surface or surfaces respectively which contains the axis of the glass. With the bi-toric glasses, in which the axes of the toric surfaces cross one another at right angles, the two equatorial planes of these surfaces represent the planes of symmetry.

The object of the invention is to bring the deficient optical effect of the zones of the toric glass as near as possible to the correct effect of its vertex place. From this correct effect, according to the investigations which led to the invention, the average effect of a zone, in each toric spectacle glass, deviates more than the mean of the two effects, which appertain to two places of the zone, chosen as will be now described. For this choice the four places come into consideration, in which the planes of symmetry intersect the zone. As the diametrically opposed places are equal in their effect, the above proposition concerns either one of the two places, which are intersected by the one, and either one of the two places, which are intersected by the other plane of symmetry. Further, the average effect of a zone is so much the better, it approximates so much nearer to the effect of the vertex place, the less the mean of the two effects of two places in this zone, chosen as stated, deviates from the effect of the vertex places, this mean being, according to the first proposition, always better than that average effect.

In order to ascertain the effect of a place, which belongs to a plane of symmetry, the place is to be considered as one through which a principal ray passes, which travels in the plane of symmetry and intersects the axis about 3 cm. behind the eye side vertex of the spectacle glass, *i. e.* where in the practical use of the spectacle glass the point of rotation of the eye is situated. In the vertex place of the glass, which belongs to both planes of symmetry, the axis represents the principal ray. For any place whatever in the toric spectacle glass the optical effect results from the two different powers, which are effective in the two principal planes belonging to the principal ray. The principal planes are perpendicular to each other, as is well-known. When the place under consideration lies in a plane of symmetry, this plane represents the one principal plane. For the vertex place both planes of symmetry become principal planes. If for a place outside the vertex, lying in one of the two planes of symmetry, of the two powers the one, which is effective in this plane of symmetry, were just as great as the power, which is effective in the same plane at the vertex place, and if further for the place under consideration the other power, which, according to the above, is effective in a plane

UNITED STATES PATENT OFFICE.

ADOLPH E. RUPP, OF CHICAGO, ILLINOIS.

COMBINED DOOR HANGER AND TRACK.

989,646.     Specification of Letters Patent.     Patented Apr. 18, 1911.

Application filed August 24, 1910. Serial No. 578,709.

*To all whom it may concern:*

Be it known that I, ADOLPH E. RUPP, a citizen of the United States, residing at Chicago, in the county of Cook and State of Illinois, have invented a new and useful Combined Door Hanger and Track, of which the following is a specification.

This invention relates to tracks and hangers for use in connection therewith.

The principal object of the present invention is to provide a novel form of support for a door of this character, said supporting structure being practically indestructible and the parts thereof coöperating to prevent the door from becoming separated from its track and to also prevent said door from swinging laterally to an objectionable extent should the bottom guard of the door become detached from any cause.

A further object is to provide a combined supporting rail and housing which is of very simple construction and which serves to keep the supporting wheels constantly under cover where their movements will not be interfered with by ice, dust, etc.

A still further object is to provide means whereby the door may be held entirely open or closed and without danger of moving back and forth when not fastened in either of these positions.

With the foregoing and other objects in view, the invention consists of certain novel details of construction and combinations of parts hereinafter more fully described and pointed out in the claims.

In the accompanying drawings, the preferred forms of the invention have been shown.

In said drawings,—Figure 1 is a side elevation of a portion of a car having the present improvements applied thereto, parts of the door and of its supporting rail and bottom guard being broken away. Fig. 2 is a section on line A—B Fig. 1. Fig. 3 is a section on line C—D Fig. 1. Fig. 4 is a section on line E—F Fig. 1. Fig. 5 is a section through the upper portion of the stop strip and the track thereon. Fig. 6 is a horizontal section through a vertically sliding door and showing the present improvements combined therewith.

Referring to the figures by characters of reference G designates a portion of a car structure having a door opening g. Secured to said car structure, above the door opening is a door supporting track formed from a single sheet of metal of the required length and bent into the form disclosed in the drawings. This track includes a side plate 1 merging into a transversely curved portion 2, downwardly extended portion 3, the bottom curved portion 4 and the upturned lip 5, there being a space between said lip 5 and the plate 1 and said plate being adapted to be secured to the wall of the car and constituting the inner wall of the track. The curved portion 2 forms a water shed, the downwardly extending portion 3 forms the outer wall of the track, and the upturned lip 5 constitutes the wheel tread or rail.

An upstanding stop strip 6 is secured to the car structure at one side of the opening g and the upper end of this strip fits snugly between one end portion of the side plate 1 and the rail 5 and a stop block 7 is seated between the upper end of this strip 6 and the portion 3, this block fitting snugly between the rail 5 and the flange, as clearly shown in Fig. 5. The other end of the supporting track which is made up of the plate 1 and the portions 2, 3, 4 and 5, is closed by a stop block 8 which fits snugly between the parts and is preferably held in place by means of one of the bolts 9 which is utilized for the purpose of holding the supporting track to the car structure. The upper or bearing edge of the rail 5 is provided, adjacent the blocks 7 and 8, with shallow recesses 10 and 11, respectively, and another recess 12 is formed in the said edge at a point equi-distant from the recesses 10 and 11.

A guard strip 13 is arranged along the car structure and below the door opening g, this strip being attached, at one end, to the bottom portion of the upstanding stop strip 6, and, at its other end, to the car structure at a point below the stop block 8. The strip 13 is spaced from the car structure intermediate said points, a distance slightly greater than the thickness of the car door H, this door being arranged with its lower edge between the car structure and the guard strip 13 while its upper edge is disposed close to the inwardly curved portion 4 of the track and bears against the lower portion of the plate 1. A hanger 14 is secured to the outer face of the door H close to each end of the upper edge portion thereof, and each of these hangers is bent partly across the upper edge of the door, as shown at 15 in Fig. 2, and is then extended upwardly through the space between the plate 1 and the rail 5.

*Figs. 15 and 16.*

$M = +1$ dptr.  $A = +4$ dptr.
$r^m_1 = 53.0$ mm.  $r^a_1 = 58.1$ mm.  $r_2 = 87.7$ mm.  $d = 1.9$ mm.

| | $w' =$ | 0.00° | 23.93° | 35.00° | |
|---|---|---|---|---|---|
| | $M^m =$ | +0.98 dptr. | +0.90 dptr. | +0.76 dptr. | |
| | $A^m =$ | +4.00 " | +4.06 " | +4.13 " | |
| | $M^m - A^m =$ | 3.02 " | 3.16 " | 3.37 " | |
| | $M^a =$ | +0.98 " | +0.77 " | +0.51 " | |
| | $A^a =$ | +4.00 " | +3.99 " | +3.87 " | |
| | $M^a - A^a =$ | 3.02 " | 3.22 " | 3.36 " | |
| | $M^m - M^a =$ | 0.00 " | 0.13 " | 0.25 " | $= 0.08\ (M-A)$ |
| | $A^m - A^a =$ | 0.00 " | 0.07 " | 0.26 " | $= 0.09\ (M-A)$ |

*Figs. 17 and 18.*

$M = +1$ dptr.  $A = +4$ dptr.
$r^m_1 = 84.5$ mm.  $r^a_1 = 57.2$ mm.  $r_2 = 100.0$ mm.  $d = 1.9$ mm.

| | $w' =$ | 0.00° | 23.93° | 35.00° | |
|---|---|---|---|---|---|
| | $M^m =$ | +1.01 dptr. | +1.02 dptr. | +1.01 dptr. | |
| | $A^m =$ | +4.00 " | +4.11 " | +4.26 " | |
| | $M^m - A^m =$ | 2.99 " | 3.09 " | 3.25 " | |
| | $M^a =$ | +1.01 " | +0.89 " | +0.74 " | |
| | $A^a =$ | +4.00 " | +4.03 " | +4.00 " | |
| | $M^a - A^a =$ | 2.99 " | 3.14 " | 3.26 " | |
| | $M^m - M^a =$ | 0.00 " | 0.13 " | 0.27 " | $= 0.12\ (M-A)$ |
| | $A^m - A^a =$ | 0.00 " | 0.08 " | 0.26 " | $= 0.12\ (M-A)$ |

*Figs. 19 and 20.*

$M = +4$ dptr.  $A = +1$ dptr.
$r^m_1 = 48.0$ mm.  $r^a_1 = 65.6$ mm.  $r_2 = 74.5$ mm.  $d = 1.9$ mm.

| | $w' =$ | 0.00° | 23.93° | 35.00° | |
|---|---|---|---|---|---|
| | $M^m =$ | +4.00 dptr. | +3.90 dptr. | +3.71 dptr. | |
| | $A^m =$ | +1.02 " | +0.82 " | +0.57 " | |
| | $M^m - A^m =$ | 2.98 " | 3.08 " | 3.14 " | |
| | $M^a =$ | +4.00 " | +4.04 " | +4.06 " | |
| | $A^a =$ | +1.02 " | +0.98 " | +0.91 " | |
| | $M^a - A^a =$ | 2.98 " | 3.06 " | 3.15 " | |
| | $M^m - M^a =$ | 0.00 " | 0.14 " | 0.35 " | $= 0.12\ (M-A)$ |
| | $A^m - A^a =$ | 0.00 " | 0.16 " | 0.34 " | $= 0.12\ (M-A)$ |

*Figs. 21 and 22.*

$M = +4$ dptr.  $A = +1$ dptr.
$r^m_1 = 50.8$ mm.  $r^a_1 = 96.00$ mm.  $r^m_2 = 81.7$ mm.  $r^a_2 = 116.8$ mm.
$d = 1.9$ mm.

| | $w' =$ | 0.00° | 23.93° | 35.00° | |
|---|---|---|---|---|---|
| | $M^m =$ | +4.00 dptr. | +3.94 dptr. | +3.80 dptr. | |
| | $A^m =$ | +1.00 " | +0.86 " | +0.68 " | |
| | $M^m - A^m =$ | 3.00 " | 3.08 " | 3.12 " | |
| | $M^a =$ | +4.00 " | +4.08 " | +4.16 " | |
| | $A^a =$ | +1.00 " | +1.04 " | +1.06 " | |
| | $M^a - A^a =$ | 3.00 " | 3.04 " | 3.10 " | |
| | $M^m - M^a =$ | 0.00 " | 0.14 " | 0.36 " | $= 0.12\ (M-A)$ |
| | $A^m - A^a =$ | 0.00 " | 0.18 " | 0.38 " | $= 0.13\ (M-A)$ |

*Figs. 23 and 24.*

$M = +4$ dptr.  $A = +1$ dptr.
$r^m_1 = 40.0$ mm.  $r^a_1 = 67.0$ mm.  $r^m_2 = 56.4$ mm.  $r^a_2 = 76.0$ mm.
$d = 1.9$ mm.

| | $w' =$ | 0.00° | 23.93° | 35.00° | |
|---|---|---|---|---|---|
| | $M^m =$ | +4.00 dptr. | +3.78 dptr. | +3.49 dptr. | |
| | $A^m =$ | +1.00 " | +0.75 " | +0.46 " | |
| | $M^m - A^m =$ | 3.00 " | 3.03 " | 3.03 " | |
| | $M^a =$ | +4.00 " | +3.98 " | +3.95 " | |
| | $A^a =$ | +1.00 " | +0.96 " | +0.90 " | |
| | $M^a - A^a =$ | 3.00 " | 3.02 " | 3.05 " | |
| | $M^m - M^a =$ | 0.00 " | 0.20 " | 0.46 " | $= 0.15\ (M-A)$ |
| | $A^m - A^a =$ | 0.00 " | 0.21 " | 0.44 " | $= 0.15\ (M-A)$ |

I claim:

1. Toric spectacle glass, in which the powers effective in the places of the marginal zone, through which pass two principal rays traveling respectively in the one and the other plane of symmetry and intersecting at the same inclination to the axis in the same axis point, about 3 cm. behind the vertex on the eye side, have such values, that the difference between that one of the two powers of one of the two places, which is effective in the plane of symmetry intersecting this place, and the power of the other place, being effective in the principal plane perpendicular to that plane of symmetry, which intersects this other place, amounts to the fifth part at the most of the astigmatic difference at the vertex.

2. Toric spectacle glass, in which the powers effective in the places of the marginal zone, through which pass two principal rays traveling respectively in the one and the other plane of symmetry and intersecting at the same inclination to the axis in the same axis point, about 3 cm. behind the vertex on the eye side, have such values, that the difference between that one of the two powers of one of the two places, which is effective in the plane of symmetry intersecting this place, and the power of the other place, being effective in the principal plane perpendicular to that plane of symmetry, which intersects this other place, amounts to the fifth part at the most of the astigmatic difference at the vertex, the astigmatic difference at one place and that at the other place being the same.

MORITZ von ROHR.

Witnesses:
PAUL KRÜGER,
ALFRED MECKEDANZ.

---

Copies of this patent may be obtained for five cents each, by addressing the "Commissioner of Patents, Washington, D. C."